July 21, 1925.
R. A. FESSENDEN
APPARATUS FOR AMPLIFYING
Filed Dec. 24, 1918
1,546,440
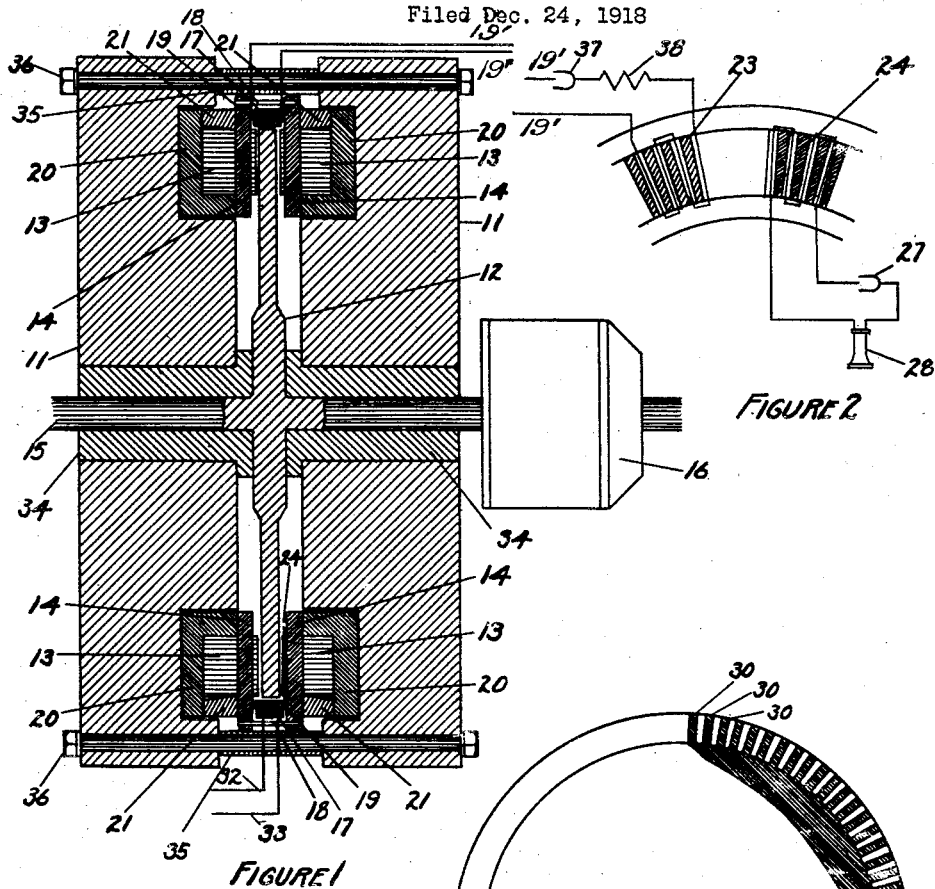
FIGURE 1
FIGURE 2
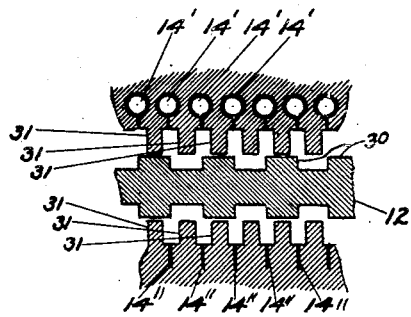
FIGURE 3
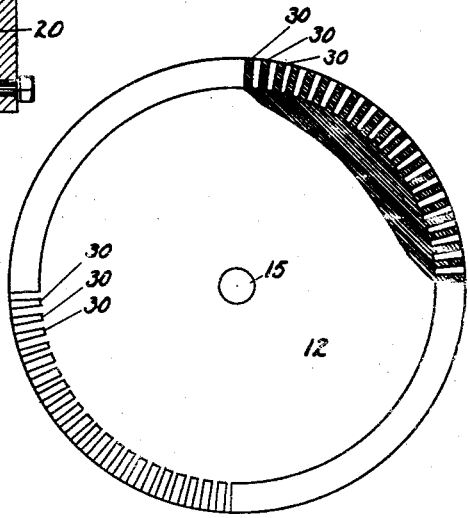
FIGURE 4
WITNESS:
Ruth H. Peirce
Alice J. Gray
INVENTOR.
Reginald A. Fessenden

Patented July 21, 1925.

1,546,440

UNITED STATES PATENT OFFICE.

REGINALD A. FESSENDEN, OF BROOKLINE, MASSACHUSETTS, ASSIGNOR TO SUBMARINE SIGNAL COMPANY, OF BOSTON, MASSACHUSETTS, A CORPORATION OF MAINE.

APPARATUS FOR AMPLIFYING.

Application filed December 24, 1918. Serial No. 268,124.

*To all whom it may concern:*

Be it known that I, REGINALD A. FESSENDEN, of Brookline, in the county of Norfolk and State of Massachusetts, a citizen of the United States, have invented certain new and useful Improvements in Apparatus for Amplifying, of which the following is the specification.

My invention relates to methods and apparatus for amplifying, that is to say, producing a large effect by means of a small one, and relates particularly to amplifying impulses and still more particularly electrical impulses, especially signalling impulses.

My invention has for its object greater efficiency of amplification, and greater simplicity, reliability, and adaptability in operation.

My invention will be understood by reference to the drawings in which my apparatus is shown in its preferred form.

Figure 1 is a vertical section through the axis of my device.

Fig. 2 is a diagrammatic showing of the circuit as connected to Fig. 1.

Fig. 3 is a section across the device shown in Fig. 1, taken near its periphery, and Fig. 4 is an elevation of the rotating inductor.

In the operation of my invention, I first cause the impulse which is to be amplified, unless it already is of the nature of electric energy, to generate a certain amount of electrical energy in an electric circuit (which circuit I call the amplified circuit). I then cause this first quantity of electric energy to produce a variation in the strength of the magnetic field of an electric generator, preferably one giving alternating currents of frequencies above audibility, for example, 50,000 or 100,000 per second.

Prior to 1905 I discovered (see U. S. Patents Nos. 793,649 and 793,650) that while if a low frequency or continuous current generator is used, the amount of electric energy generated in the armature of the dynamo is less or not substantially greater than the energy of the amplified circuit, if a very high frequency generator is used, a very much greater amount of electric energy may be drawn off from the dynamo armature than that of the amplified circuit.

This energy may be used directly, or may be rectified for utilization as shown in Figs. 2 and 10 of said U. S. Patents Nos. 793,649 and 793,650.

In Figure 1 is shown a high frequency dynamo of the type invented by applicant and described by applicant in U. S. Patent 706,737 (filed May 29, 1901, issued August 12, 1902) and U. S. Patent 960,631 (filed October 10, 1907, and issued June 7, 1912) a photograph of which is reproduced in the Transactions of the American Institute of Electrical Engineers, July 29, 1908, Figure 22, page 589.

Figures 1 and 4 show, partly diagrammatically, the construction and circuits of a dynamo of this type, but differing as to construction in a number of important features, in order to make it suitable for carrying out my invention, and differing entirely as regards circuits and electrical constants.

In Figure 1, this figure being taken through the teeth 30 and 31 of Fig. 3, 12 is a rotating inductor mounted on a shaft 15, and shown in detail in Figure 4 (side view) and Figure 3 (top view). This inductor consists of a rotating disc of steel or other magnetic material having its edges milled so as to form the projections 30, 30, 30.

34, 34 are phosphor-bronze bearings in which the shaft 15 rotates, and which also serve as end-thrust bearings to keep the rotor disc 12 centered.

16 is a high speed motor, preferably a 500 cycle motor for driving the shaft 15. 17 is a ring-shaped field winding (shown in cross section) having terminals 32, 33, as shewn. 19 is the auxiliary field coil whose use is described later in the specification, and 19', 19' its terminals. 24 is one of the armature circuits shown more in detail in Figure 2.

The armature is built in the following way: two discs of brass or iron, 11, are turned to circular shape, and grooves are cut in their inner faces in which are inserted the rings 20, 20, 20, 20, shown in cross section. On the lower rims of these rings are wound long continuous strips of magnetic material, preferably iron, and preferably of the silicon iron alloy discovered by applicant in 1890 to have high electrical resistance, and minimum hysteresis. These strips of silicon alloy are preferably insulated by a thin coating of heat resistant enamel.

After these strips are wound, rings 21, are slipped over their outside circumferences to hold the strips in place, and projections 31, 31, 31, 31, are milled in the outside faces of the silicon iron strips as shown in Figures 3 and 2.

A loop conductor is then after inserting the strips 13, 13, wound around the projections in the grooves between the projections, as shown at 24, Figure 2.

In order to complete the magnetic circuit of the field, fine slots 14″, 14″, 14″, 14″, 14″, Fig. 3, are milled at the bottom of the grooves which have been milled in the wound strips 13, 13, and in these fine slots are inserted thin strips 14, 14, 14, 14, of silicon iron, the strips preferably having a thickness of about five one thousandths of an inch, and the magnetic circuit is finally completed by attaching similar bridging strips 18, 18, so as to make good magnetic contact with the ends of the strips 14, 14, 14, 14. This method of completing the magnetic circuit of high frequency alternators has a number of very important advantages, i. e.

1. It makes a good magnetic contact between the strips 13, and the fixed part of the field circuit.

2. It involves the minimum amount of hysteresis in the armature since the variation in flux caused by the rotation of the inductor 12 has merely to swing from one of the projections 31 to the adjacent projection 31.

3. It makes the minimum of eddy currents since the strips 14 are very thin and of high resistant material.

4. It also makes the minimum of eddy current opposition (due to eddy currents in the strips 13, 13) to changes of magnetism in the field circuit, since there is no closed circuit around which the eddy currents in the strips 13 can flow.

The air gaps between the rotor 12, and the armature iron pole faces 31, 31, are maintained constant and of the proper amount by means of the spacing tubes 35, 35, and assembly bolts 36, 36.

As an alternative to the slots 14″, 14″, and strips 14, circular holes 14′, 14′, 14′, 14′, may be drilled radially as shown and thin strips rolled into the shape of a tube inserted in these holes.

Applicant has discovered that for the best results, especially in amplifying speech, the time constant of the field coil should be small, preferably of the order of one one thousandth of a second, though it may be somewhat smaller or larger. Also that the angle of lag in the field coil should be preferably in the neighborhood of 45 degrees, though it may be larger or smaller.

This value of the time constant and of the angle of lag can be obtained by means well known to those skilled in the art, the method disclosed in the application being probably the simplest. As is well known, the time constant in a circuit without capacity is $L/R$, where $L$ is the coefficient of self-induction and $R$ is the resistance. In order that $L/R$ may not be greater than the order of 1/1000 second, therefore, if $R$ is 100 ohms $L$ must not be greater than the order of $\frac{1}{10}$ henry. Now with two dynamos of this type, $L/R$ will depend only, other things being equal, on the cross section of the field coil. For if wire twice the diameter be used for the field coil, there will be it is true only $\frac{1}{4}$ the turns and $\frac{1}{16}$ the inductance. But being 4 times the turns, and each turn having 4 times the resistance, the value of $R$ will be 16 times as great, and so the ratio $L/R$ will be the same. But if the field coil be cut down to $\frac{1}{4}$ its previous cross section, then since there are but one fourth the turns, there will be only $\frac{1}{16}$ the inductance, and as the resistance will only be cut down to $\frac{1}{4}$, the value of $L/R$ will be only $\frac{1}{4}$ of what it was before. Now comparing the field coil of the present application with the field coil of other high frequency dynamos, it will be seen that the ratio of field coil section to armature laminations section may be, for example, only 1/20 as great, and consequently the time constant only 1/20th as great, so far as the field section affects its value.

But in addition it will be noted that the magnetic circuit in which the field coil lies is led from the adjacent faces of the armature laminations, instead from the opposite faces, as has heretofore been the custom, whereby the amount of iron which has to be magnetized and demagnetized by the voice currents and the amount of eddy currents (which greatly increase the time constant), is reduced to a fraction of the value in the usual method of construction; in practice the inductance is found to be reduced to approximately 1/5th its usual value by this arrangement.

Also the arrangement of the bearings and of the rotor is such as to permit of a very short air gap, thereby cutting down the necessary volume of copper in the field for a given output, thereby again decreasing the ratio $L/R$.

It will be seen therefore that while with the usual construction the time constant is necessarily of the order of 1/10 second, with applicant's construction the time constant is of the order of 1/1000 second. Two such dynamos have actually been built and tested, and gave an amplification of 30, being the first dynamos ever built which actually amplified frequencies of the order of 1/1000 cycles.

As regards the tangent of the angle of lag, this is given by the formula $L\omega/R$, where $w$ is pi times the frequency. If $L$ is, as shown, less than 1/1000 of $R$, then $L\omega/R$ will be approximately equal to unity, i. e. the angle of lag will be approximately 45 degrees for the lower voice frequencies, and of the same order as the higher voice frequencies.

In operation the current from the amplified circuit 32, 33, which may be the current from a telephone transmitter or a submarine sound detector, flows around the field coil 17, and generates a magnetic flux in the field circuit. The location of this flux in the projections 31 is varied 50,000 times per second by the motion of the rotor 12, and generates energy in the armature winding 24.

This energy may be utilized directly or may be rectified as shown in Figure 2 by the rectifier 27, and the rectified current utilized in any suitable way, as, for example to operate the telephone receiver, 28.

If the generator were a direct current generator, or one of ordinary frequency, or if the field circuit were not properly proportioned, as described above, no amplification of energy would be obtained.

Applicant has, however, discovered that the dynamo type of amplifier can be made to operate most successfully, for example, to amplify speech, and to give practically any desired degree of amplification if (1) In place of constructing a machine as a direct current generator or one of ordinary frequencies, it is constructed as a generator of very high, and preferably inaudible, frequencies (2) It is suitably designed to respond to fluctuations of current in the amplified circuit (3) The armature current is rectified, or current from a portion of the armature winding is rectified and used to still further excite the field.

This latter arrangement is shown in Figure 2, where a few turns 23 of the armature are connected through the resistance 38, rectifier 37, to the terminals 19', 19' of the auxiliary field coil 19, whereby when a small current is passed through the amplified circuit 32-33, a larger current is generated in the armature coils 23, and still further increases the field strength and thereby still further increases the strength of the amplified current in the armature windings 24.

Applicant has discovered that this arrangement is operative with dynamos of the very high frequency type described, since if a fluctuating telephone current of a mean frequency of approximately 800 is sent to the amplified circuit 32—33, and the time constant of the amplified circuit is of the order of a thousandth of a second, the response to the increase in current in the amplified circuit will take place as soon as the projections of the rotor move from opposite one of the armature projections 31, to the next armature projection, i. e., in approximately one fifty thousandth of a second, so that there is substantially no lag in the effect produced by the armature coils 23.

Whereas, if the frequency were low, the lag would be so great as to make the speech unintelligible.

I have found that a suitable size of rotor 12 is in the neighborhood of 2 to 4 inches in diameter, and that a suitable speed of rotation is 250 to 500 times per second and amplifiers of this type constructed by applicant have on actual test amplified the initial energy more than 900 times.

It will be noted that in the construction shown in Figs. 1 and 2 the magnetic circuit of the field of the alternator is led from the face of the armature laminations 13, 13 in place of from the back of said laminations as shown in previous designs of applicant and others. This method has been found to operate much more efficiently in practice and to give larger amplifications and less distortion.

What I claim is:

A high frequency dynamo comprising a field coil, having a time constant of one-thousandth of a second, a plurality of armature coils, an inductor rotating adjacent all of said coils and means for providing a regenerative connection between one or more armature coils and said field coil, said means including a rectifier.

REGINALD A. FESSENDEN.